US011318984B2

(12) United States Patent
Shin et al.

(10) Patent No.: US 11,318,984 B2
(45) Date of Patent: May 3, 2022

(54) ELECTRONIC DEVICE FOR ASSISTING DRIVING OF VEHICLE AND METHOD THEREFOR

(71) Applicant: Samsung Electronics Co., Ltd., Suwon-si (KR)

(72) Inventors: Sang-min Shin, Yongin-si (KR); Deok-young Kim, Seoul (KR); Yong-wook Kim, Seoul (KR); Dae-in Choi, Jeongeup-si (KR); Gang-heok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 16/470,404

(22) PCT Filed: Nov. 14, 2017

(86) PCT No.: PCT/KR2017/012842
§ 371 (c)(1),
(2) Date: Jun. 17, 2019

(87) PCT Pub. No.: WO2018/110837
PCT Pub. Date: Jun. 21, 2018

(65) Prior Publication Data
US 2019/0308656 A1    Oct. 10, 2019

(30) Foreign Application Priority Data
Dec. 16, 2016  (KR) .................. 10-2016-0172884

(51) Int. Cl.
*B62D 5/00*    (2006.01)
*B60W 50/16*   (2020.01)
(Continued)

(52) U.S. Cl.
CPC .............. *B62D 5/006* (2013.01); *B60K 28/06* (2013.01); *B60W 40/08* (2013.01); *B60W 40/09* (2013.01);
(Continued)

(58) Field of Classification Search
CPC ....................................................... B62D 5/006
See application file for complete search history.

(56) References Cited

U.S. PATENT DOCUMENTS

| 8,519,853 B2 * | 8/2013 | Eskandarian | G08B 21/06 340/575 |
| 8,666,603 B2 * | 3/2014 | Morris | B62D 1/046 701/42 |

(Continued)

FOREIGN PATENT DOCUMENTS

| EP | 2 040 235 A1 | 3/2009 |
| JP | 7-205676 A | 8/1995 |

(Continued)

OTHER PUBLICATIONS

International Search Report dated Mar. 9, 2018, issued in International Application No. PCT/KR2017/012842.

*Primary Examiner* — Michael A Berns
(74) *Attorney, Agent, or Firm* — Jefferson IP Law, LLP

(57) ABSTRACT

Provided are an electronic device and method for assisting driving of a vehicle, the electronic device including a sensor configured to sense a rotation direction of a steering wheel of the vehicle, a processor configured to monitor rotation direction switching events of the steering wheel, obtain a rotation direction switching pattern about a number of rotation direction switching events of the steering wheel per unit time, and determine whether to provide an alert to a driver of the vehicle, based on the obtained rotation direction
(Continued)

switching pattern, and an outputter configured to output the alert to the driver, based on the determination.

16 Claims, 11 Drawing Sheets

(51) Int. Cl.
    *B62D 5/04*     (2006.01)
    *B62D 15/02*     (2006.01)
    *B60W 40/08*     (2012.01)
    *B60W 50/14*     (2020.01)
    *B60K 28/06*     (2006.01)
    *B60W 40/105*     (2012.01)
    *B60W 40/09*     (2012.01)

(52) U.S. Cl.
    CPC .......... *B60W 40/105* (2013.01); *B60W 50/14* (2013.01); *B60W 50/16* (2013.01); *B62D 5/046* (2013.01); *B62D 15/021* (2013.01)

(56) References Cited

U.S. PATENT DOCUMENTS

| | | | |
|---|---|---|---|
| 9,139,083 | B2 | 9/2015 | Song et al. |
| 9,656,689 | B2 * | 5/2017 | Klank ................. B62D 15/027 |
| 9,827,992 | B2 * | 11/2017 | Prakah-Asante ..... B60W 40/09 |
| 9,955,925 | B2 * | 5/2018 | Kannan ................ A61B 5/7264 |
| 10,352,958 | B2 * | 7/2019 | Park ....................... G01P 15/00 |
| 2009/0033501 | A1 * | 2/2009 | Chen ..................... G08B 21/06 |
| | | | 340/576 |
| 2016/0327407 | A1 | 11/2016 | Park |
| 2016/0328942 | A1 | 11/2016 | Van Winckel et al. |

FOREIGN PATENT DOCUMENTS

| | | |
|---|---|---|
| JP | 2004-310738 A | 11/2004 |
| KR | 10-2005-0027814 A | 3/2005 |
| KR | 10-2012-0070074 A | 6/2012 |
| KR | 10-1490910 B1 | 2/2015 |
| KR | 10-2016-0131472 A | 11/2016 |

* cited by examiner

FIG. 3
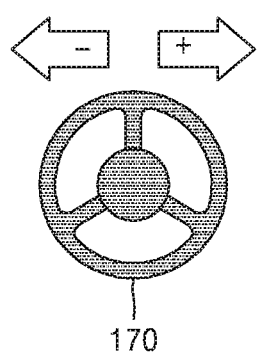
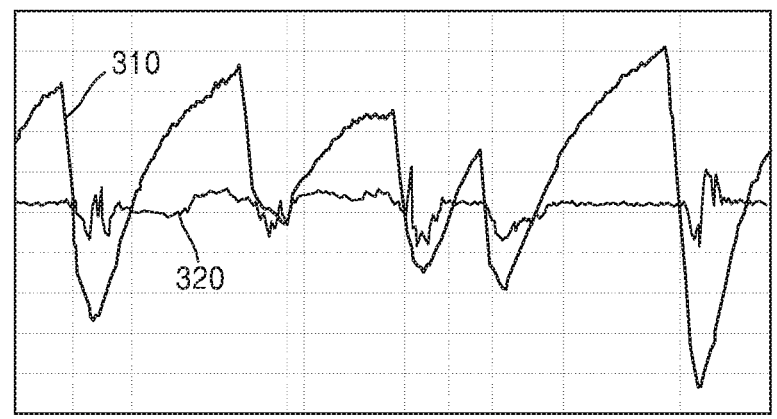

FIG. 6
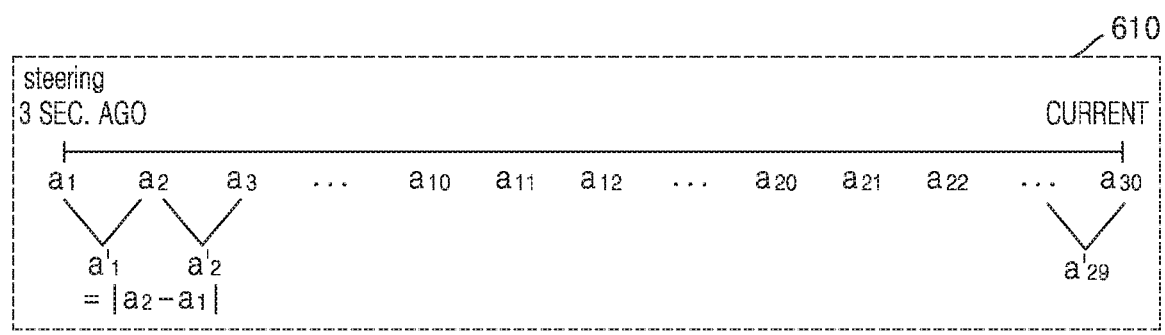
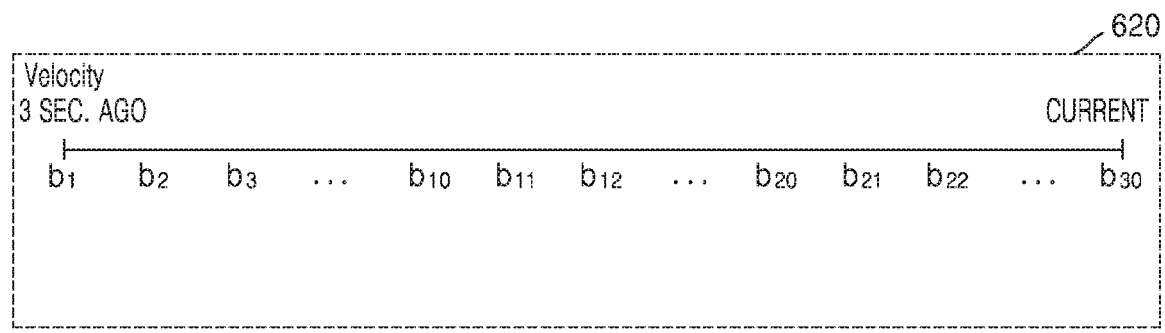

FIG. 7

Count_headingchange_05
count=0

710 —
$Mean_1 = \text{average}_{\text{steering}}(a_1 \cdots a_5) = \dfrac{a_1 + a_2 + \cdots + a_5}{5}$ : AVERAGE DURING FIRST 0.5 SEC.

$Mean_2 = \text{average}_{\text{steering}}(a_6 \cdots a_{10}) = \dfrac{a_6 + a_7 + \cdots + a_{10}}{5}$ : AVERAGE DURING SECOND 0.5 SEC.

$\vdots$ $Mean_6 = \text{average}_{\text{steering}}(a_{26} \cdots a_{30}) = \dfrac{a_{26} + a_{27} + \cdots + a_{30}}{5}$ : AVERAGE DURING SIXTH 0.5 SEC.

720 —
if $Mean_1 \cdot Mean_2 < 0$
    count = count + 1
if $Mean_2 \cdot Mean_3 < 0$
    count = count + 1
if $Mean_3 \cdot Mean_4 < 0$
    count = count + 1
if $Mean_4 \cdot Mean_5 < 0$
    count = count + 1
if $Mean_5 \cdot Mean_6 < 0$
    count = count + 1
end Count_headingchange05 = count

FIG. 8

```
Count_steeringchange_05
  count=0
  ┌─────────────────────────────────────────────────────────┐
  │ Gradient Mean₁ = Mean₂ − Mean₁ ; Mean_1 = AVERAGE DURING FIRST 0.5 SEC.
810─┤ Gradient Mean₂ = Mean₃ − Mean₂
  │   ⋮
  └─────────────────────────────────────────────────────────┘
  ┌─────────────────────────────────────────────────────────┐
  │ Gradient Mean₅ = Mean₆ − Mean₅
  │ if Gradient Mean₁ · Gradient Mean₂ < 0
  │   count = count + 1
  │ if Gradient Mean₂ · Gradient Mean₃ < 0
820─┤   count = count + 1
  │ if Gradient Mean₃ · Gradient Mean₄ < 0
  │   count = count + 1
  │ if Gradient Mean₄ · Gradient Mean₅ < 0
  │   count = count + 1
  └─────────────────────────────────────────────────────────┘
  end
  Count steeringchange05 = count
```

ELECTRONIC DEVICE FOR ASSISTING DRIVING OF VEHICLE AND METHOD THEREFOR

TECHNICAL FIELD

The present disclosure relates to a device and method for assisting driving of a vehicle.

BACKGROUND ART

Vehicles are used as a major transportation means in modern society. The development of the automobile industry has led to the popularization of automobiles, and long drives have significantly increased due to the expansion of highways and road networks. In addition, drives without sufficient sleep have greatly increased.

As such, many drivers are exposed to a risk of traffic accidents due to careless driving or drowsy driving.

DESCRIPTION OF EMBODIMENTS

Technical Problem

Provided are an electronic device and method for assisting driving of a vehicle.

Solution to Problem

According to some embodiments, a method and device for assisting driving of a vehicle in terms of careless driving or drowsy driving may be provided.

According to some other embodiments, a method and device for providing an alert to a driver when careless driving or drowsy driving is detected may be provided.

BRIEF DESCRIPTION OF DRAWINGS

FIG. 3 is a diagram showing an example in which the electronic device senses motion of a steering wheel, according to an embodiment.

FIG. 6 is a diagram showing an example in which the electronic device senses a steering angle or a velocity of a vehicle, according to an embodiment.

FIG. 7 is a diagram showing an example in which the electronic device counts steering direction switching events, according to an embodiment.

FIG. 8 is a diagram showing an example in which the electronic device counts rotation direction switching events, according to an embodiment.

BEST MODE

According to an embodiment of the disclosure, an electronic device for assisting driving of a vehicle includes a sensor configured to sense a rotation direction of a steering wheel of the vehicle, a processor configured to monitor rotation direction switching events of the steering wheel, obtain a rotation direction switching pattern about rotation direction switching events of the steering wheel, and determine whether to provide an alert to a driver of the vehicle, based on the obtained rotation direction switching pattern, and an outputter configured to output the alert to the driver, based on the determination.

According to another embodiment of the disclosure, a method for assisting driving of a vehicle includes sensing a rotation direction of a steering wheel of the vehicle, monitoring rotation direction switching events of the steering wheel and obtaining a rotation direction switching pattern about rotation direction switching events of the steering wheel, determining whether to provide an alert to a driver of the vehicle, based on the obtained rotation direction switching pattern, and outputting the alert to the driver, based on the determination.

According to another embodiment of the disclosure, a computer-readable recording medium has recorded thereon a program for executing the above-described method on a computer.

MODE OF DISCLOSURE

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be embodied as hardware, software, or a combination of hardware and software.

Hereinafter, the present disclosure will be described in detail by explaining embodiments of the disclosure with reference to the attached drawings. The disclosure may, however, be embodied in many different forms and is not construed as being limited to the embodiments set forth herein.

Reference will now be made in detail to embodiments, examples of which are illustrated in the accompanying drawings.

Figure 1:
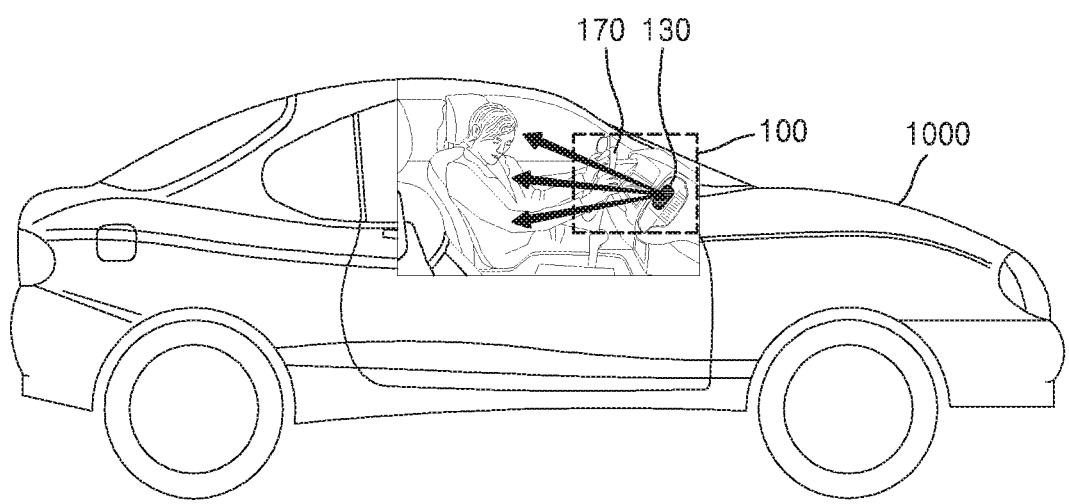
FIG. 1 is a diagram showing an example of operation of an electronic device for assisting driving of a vehicle, according to an embodiment.

FIG. 1 is a diagram showing an example of operation of an electronic device 100 for assisting driving of a vehicle 1000, according to an embodiment.

The vehicle 1000 may include the electronic device 100 for assisting driving of the vehicle 1000 (hereinafter simply referred to as the electronic device 100). The electronic device 100 is a device for assisting driving of the vehicle 1000 to more conveniently and safely drive the vehicle 1000.

Specifically, the electronic device 100 may allow a driver to more safely drive the vehicle 1000 by sensing motion of a steering wheel 170 and providing an alert to the driver when necessary.

Referring to FIG. 1, when the driver is driving while drowsy, the electronic device 100 according to an embodiment may recognize drowsy driving by using a sensor connected to the steering wheel 170, and provide the alert through an outputter 130 to the driver who is driving while drowsy. The outputter 130 according to an embodiment may provide the alert in an audible form or a visible form.

When the driver is driving carelessly, the electronic device 100 according to an embodiment may recognize careless driving by monitoring rotation direction switching events of the steering wheel 170, and provide the alert to the driver who is driving carelessly.

Figure 2:
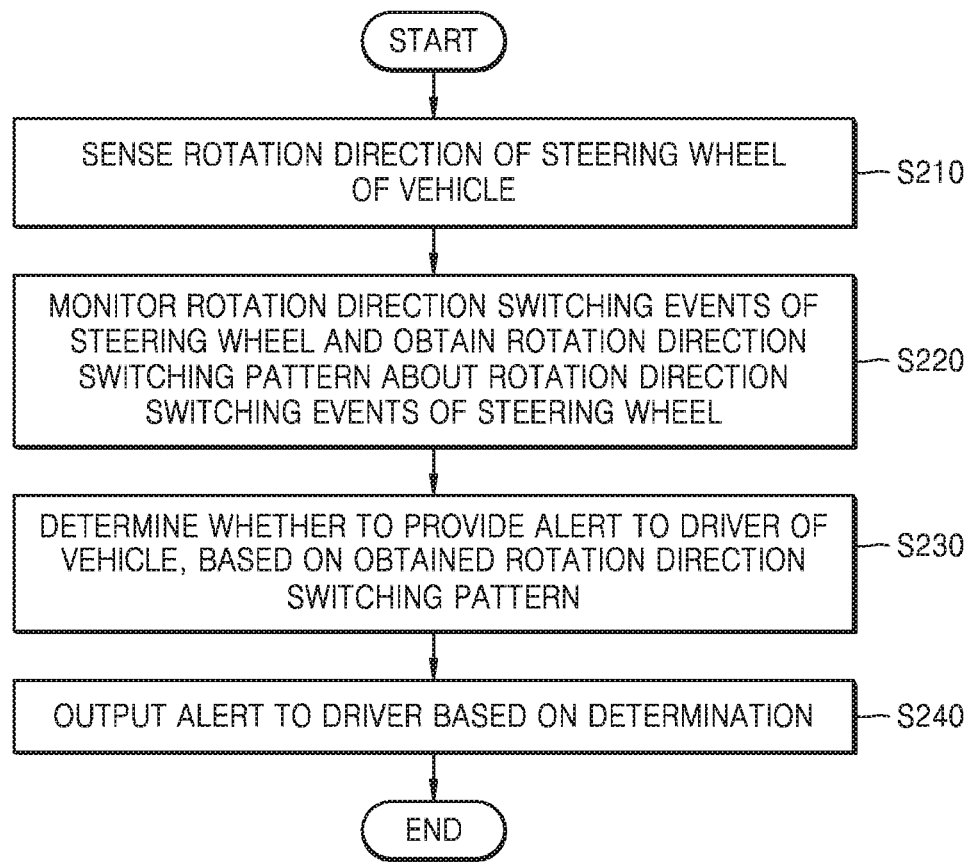
FIG. 2 is a flowchart of a method, performed by the electronic device, for assisting driving of a vehicle, according to an embodiment.

FIG. 2 is a flowchart of a method, performed by the electronic device 100, for assisting driving of the vehicle 1000, according to an embodiment.

In operation S210, the electronic device 100 according to an embodiment senses a rotation direction of the steering wheel 170 of the vehicle 1000. The rotation direction according to an embodiment may refer to a direction to which a steering direction of the steering wheel 170 is switched, and be expressed as a value. For example, a clockwise rotation direction may be expressed as a positive value and a counterclockwise rotation direction may be expressed as a negative value.

The electronic device 100 according to an embodiment may sense motion of the steering wheel 170. For example, in addition to the rotation direction of the steering wheel 170, the electronic device 100 may sense a steering angle of the steering wheel 170, a rotation speed of the steering wheel 170, a steering direction of the steering wheel 170, steering direction switching events of the steering wheel 170, rotation direction switching events of the steering wheel 170, the number of rotation direction switching events of the steering wheel 170 per unit time, the number of steering direction switching events of the steering wheel 170 per unit time, and a rotation angle of the steering wheel 170.

The steering angle according to an embodiment may refer to an angle generated due to rotation of the steering wheel 170 with respect to the steering direction of the steering wheel 170 when a driving direction of the vehicle 1000 is a forward direction.

The rotation speed according to an embodiment may refer to a speed at which the steering wheel 170 is rotated.

The steering direction according to an embodiment may indicate whether a heading direction of the vehicle 1000 is a right direction or a left direction with respect to a forward direction to correspond to the steering angle of the steering wheel 170.

The steering direction switching event according to an embodiment may refer to a case in which the steering direction is switched from a right direction to a left direction or from a left direction to a right direction.

The rotation direction switching event according to an embodiment may refer to a case in which the rotation direction of the steering wheel 170 is switched from a clockwise direction to a counterclockwise direction or from a counterclockwise direction to a clockwise direction.

The number of rotation direction switching events of the steering wheel 170 per unit time according to an embodiment may indicate the number of times that rotation direction switching events occur per unit time.

The number of steering direction switching events of the steering wheel 170 per unit time according to an embodiment may indicate the number of times that steering direction switching events occur per unit time.

The rotation angle of the steering wheel 170 according to an embodiment may indicate a degree by which the steering direction of the steering wheel 170 is changed from a reference direction.

A sensor according to an embodiment may sense, for example, a velocity of the vehicle 1000 or motion of the vehicle 1000. The electronic device 100 according to an embodiment may be configured to sense the motion of the steering wheel 170 only when the velocity of the vehicle 1000 is equal to or higher than a preset value. For example, the electronic device 100 may be configured to sense the motion of the steering wheel 170 only when the velocity of the vehicle 1000 is equal to or higher than 80 km/h. In this case, the electronic device 100 may provide an alert only when, for example, the vehicle 1000 runs on a highway for a long distance. When the electronic device 100 is configured to sense the motion of the steering wheel 170 only when the velocity of the vehicle 1000 is equal to or higher than the preset value, the preset value may be determined based on a user input.

In operation S220, the electronic device 100 according to an embodiment monitors the rotation direction switching events of the steering wheel 170 and obtains a rotation direction switching pattern about the rotation direction switching events of the steering wheel 170. For example, the electronic device 100 may monitor the number of rotation direction switching events of the steering wheel 170 per unit time and obtain a rotation direction switching pattern about the number of rotation direction switching events of the steering wheel 170 per unit time.

The electronic device 100 according to an embodiment may monitor the rotation direction switching events of the steering wheel 170 based on the rotation direction or the rotation direction switching events sensed in operation S210. The rotation direction switching event according to an embodiment may refer to a case in which the rotation direction of the steering wheel 170 is switched from a clockwise direction to a counterclockwise direction or from a counterclockwise direction to a clockwise direction. The electronic device 100 according to an embodiment may recognize the rotation direction switching events by sensing the rotation direction.

The electronic device 100 according to an embodiment may obtain the rotation direction switching pattern about the rotation direction switching events of the steering wheel 170 by monitoring the rotation direction switching events of the steering wheel 170.

The rotation direction switching pattern according to an embodiment may indicate variations in the number of rotation direction switching events per unit time during a certain time. For example, the rotation direction switching pattern may refer to a pattern indicating the number of rotation direction switching events of the steering wheel 170 per unit time based on time. For example, the electronic device 100 may obtain a rotation direction switching pattern indicating the number of rotation direction switching events of the steering wheel 170 per 3 sec. based on time. The rotation direction switching pattern may include a pattern of the number of rotation direction switching events.

The electronic device 100 according to an embodiment may count and obtain the number of rotation direction switching events of the steering wheel 170 regardless of the steering angle of the steering wheel 170. Alternatively, the electronic device 100 according to an embodiment may count and obtain the number of rotation direction switching events of the steering wheel 170 per unit time. For example, when the steering angle of the steering wheel 170 is changed from −50° to −60° and then from −60° to −30°, the rotation direction of the steering wheel 170 is switched to a clockwise direction at a timing when the steering angle of the steering wheel 170 starts to be changed from −60° to −30°. Although the vehicle 1000 continuously moves in a left direction according to the steering angle, when the rotation direction of the steering wheel 170 is switched from a counterclockwise direction to a clockwise direction, the electronic device 100 may additionally count a rotation direction switching event to a clockwise direction. A method of counting the number of rotation direction switching events, according to an embodiment, will be described below in relation to FIG. 8.

The electronic device 100 according to an embodiment may also obtain patterns other than the rotation direction switching pattern. For example, in addition to the rotation direction switching pattern, the electronic device 100 may obtain a rotation direction pattern based on time, a steering angle pattern based on time, a rotation speed pattern based on time, a steering direction pattern based on time, a steering direction switching pattern based on time, a pattern of the number of rotation direction switching events based on time, a pattern of the number of steering direction switching events based on time, and a rotation angle pattern based on time.

As described below, the electronic device 100 according to an embodiment may determine whether to provide the alert to a driver, by using not only the rotation direction switching pattern but also the above-mentioned other patterns. The electronic device 100 according to an embodiment may determine whether to provide the alert to the driver, by using not only the rotation direction switching pattern but also an average velocity of the vehicle 1000, a velocity dispersion of the vehicle 1000, a maximum steering angle of the steering wheel 170, etc.

In operation S230, the electronic device 100 according to an embodiment determines whether to provide the alert to the driver of the vehicle 1000, based on the rotation direction switching pattern obtained in operation S220. The electronic device 100 according to an embodiment may determine to provide the alert to the driver, upon determining that a driving status of the vehicle 1000 or a status of the driver is abnormal, based on the rotation direction switching pattern obtained in operation S220.

The electronic device 100 according to an embodiment may determine the driving status of the vehicle 1000 or the status of the driver based on the rotation direction switching pattern obtained in operation S220. The status of the driver may include a fatigue level of the driver.

For example, the electronic device 100 may determine whether the driver is driving carelessly or while drowsy, by analyzing the rotation direction switching pattern. Upon determining that the driver is driving carelessly or while drowsy, the electronic device 100 may determine to provide the alert to the driver. As another example, the electronic device 100 may determine a fatigue level of the driver based on the rotation direction switching pattern, and determine to provide the alert, when the determined fatigue level is equal to or higher than a preset value.

The electronic device 100 according to an embodiment may use not only the rotation direction switching pattern obtained in operation S220 but also one or more other patterns to determine the status of the driver. For example, the electronic device 100 may determine the status of the driver by using not only the rotation direction switching pattern obtained in operation S220 but also the steering angle pattern, the rotation speed pattern, the pattern of the number of steering direction switching events, and the rotation angle pattern. The electronic device 100 according to an embodiment may determine whether to provide the alert to the driver, by using not only the rotation direction switching pattern but also the average velocity of the vehicle 1000, the velocity dispersion of the vehicle 1000, the maximum steering angle of the steering wheel 170, etc. The electronic device 100 according to an embodiment may analyze the above-mentioned one or more patterns or values including the rotation direction switching pattern, by using a machine learning algorithm, and determine whether to provide the alert to the driver, based on the analysis result. The machine learning algorithm may refer to a technique for predicting a current status or the future by collecting and analyzing data. For example, the machine learning algorithm may include a random forest algorithm.

In operation S240, the electronic device 100 according to an embodiment outputs the alert to the driver based on the determination of operation S230.

The alert may be provided in a visible form and/or an audible form. For example, a display included in the outputter 130 may provide the alert to the driver in a visible form. As another example, a speaker included in the outputter 130 may provide the alert to the driver in an audible form.

FIG. 3 is a diagram showing an example in which the electronic device 100 senses motion of the steering wheel 170, according to an embodiment.

Referring to FIG. 3, the electronic device 100 may obtain one or more types of data. For example, the electronic device 100 may obtain data about variations in a steering angle 310 of the steering wheel 170 based on time. As another example, the electronic device 100 may obtain data about variations in a velocity 320 of the vehicle 1000 based on time.

The electronic device 100 according to an embodiment may determine a value of the steering angle 310 as a positive value when the steering wheel 170 is rotated in a clockwise direction, and determine the value of the steering angle 310 as a negative value when the steering wheel 170 is rotated in a counterclockwise direction.

Figure 4:
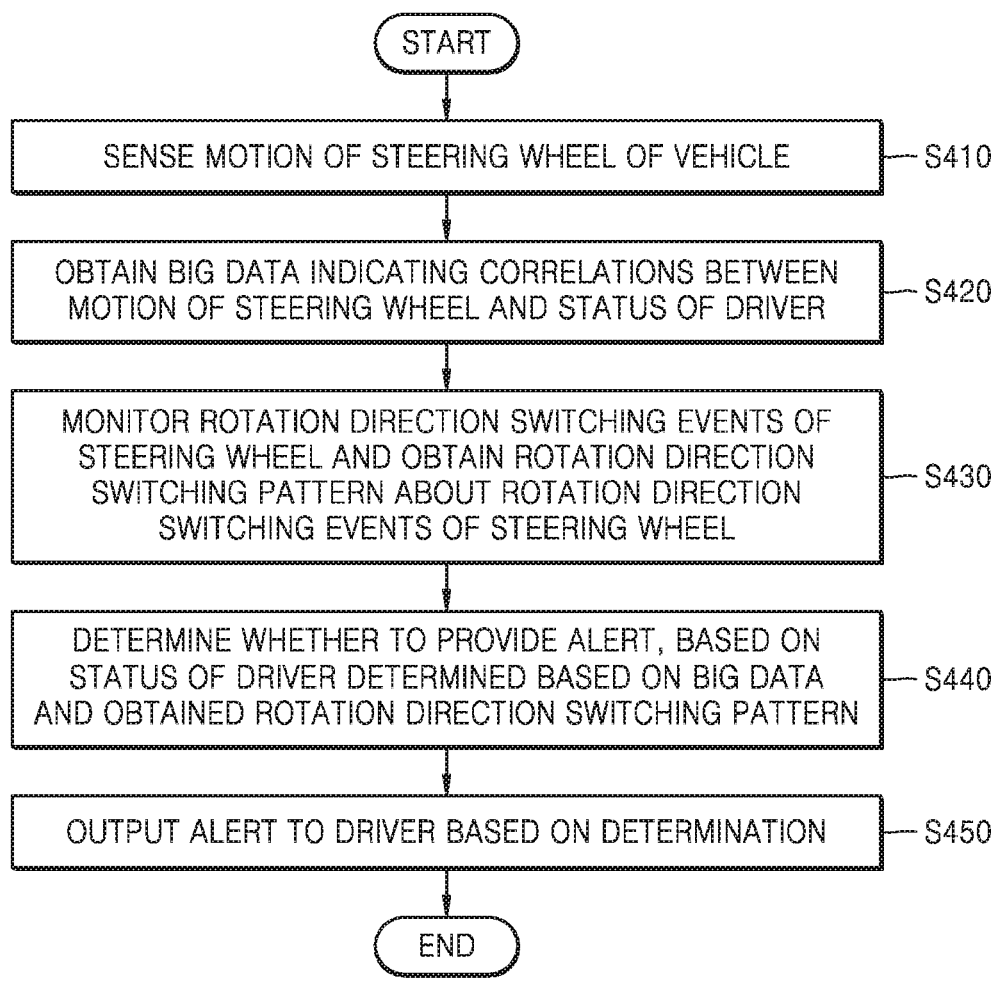
FIG. 4 is a flowchart of a method, performed by the electronic device, of providing an alert to a driver by using big data, according to an embodiment.

FIG. 4 is a flowchart of a method, performed by the electronic device 100, of providing an alert to a driver by using big data, according to an embodiment.

In operation S410, the electronic device 100 according to an embodiment senses motion of the steering wheel 170 of the vehicle 1000. This operation corresponds to the above-described operation S220 and thus a detailed description thereof will not be provided herein for brevity.

In operation S420, the electronic device 100 according to an embodiment obtains big data indicating correlations between the motion of the steering wheel 170, which is sensed in operation S410, and a status of the driver.

The big data may be obtained from outside the electronic device 100. For example, the electronic device 100 may receive the big data from an external device. As another example, the electronic device 100 may receive a necessary part of the big data, from an external server.

The big data may indicate correlations between the motion of the steering wheel 170 and the status of the driver. For example, the big data may include data about correlations between a rotation direction switching pattern and a fatigue level of the driver. As another example, the big data may include data about correlations between a steering angle pattern, a rotation speed pattern, a pattern of the number of steering direction switching events, a rotation angle pattern, an average velocity of the vehicle 1000, a velocity dispersion of the vehicle 1000, or a maximum steering angle of the steering wheel 170, and the status of the driver.

In operation S430, the electronic device 100 according to an embodiment monitors rotation direction switching events of the steering wheel 170 and obtains a rotation direction switching pattern about the rotation direction switching events of the steering wheel 170. This operation corresponds to the above-described operation S220 and thus a detailed description thereof will not be provided herein for brevity.

In operation S440, the electronic device 100 according to an embodiment determines the status of the driver based on the big data obtained in operation S420 and the rotation direction switching pattern obtained in operation S430, and determines whether to provide the alert, based on the determined status of the driver.

The electronic device 100 according to an embodiment may analyze the big data obtained in operation S420 and the rotation direction switching pattern obtained in operation S430, and determine the status of the driver based on the analysis result. For example, as a result of analyzing the rotation direction switching pattern based on the big data, it may be determined that the driver is driving while drowsy or carelessly.

The electronic device 100 according to an embodiment may analyze the big data obtained in operation S420, the rotation direction switching pattern obtained in operation S430, and at least one of the steering angle pattern, the rotation speed pattern, the pattern of the number of steering direction switching events, or the rotation angle pattern obtained in operation S430, and determine the status of the driver based on the analysis result.

When the determined status of the driver is not suitable for driving (for example, when the driver is driving while drowsy or carelessly), the electronic device 100 according to an embodiment may determine to provide the alert to the driver.

In operation S450, the electronic device 100 according to an embodiment outputs the alert to the driver based on the determination of operation S440. This operation corresponds to the above-described operation S240 and thus a detailed description thereof will not be provided herein for brevity.

Figure 5:
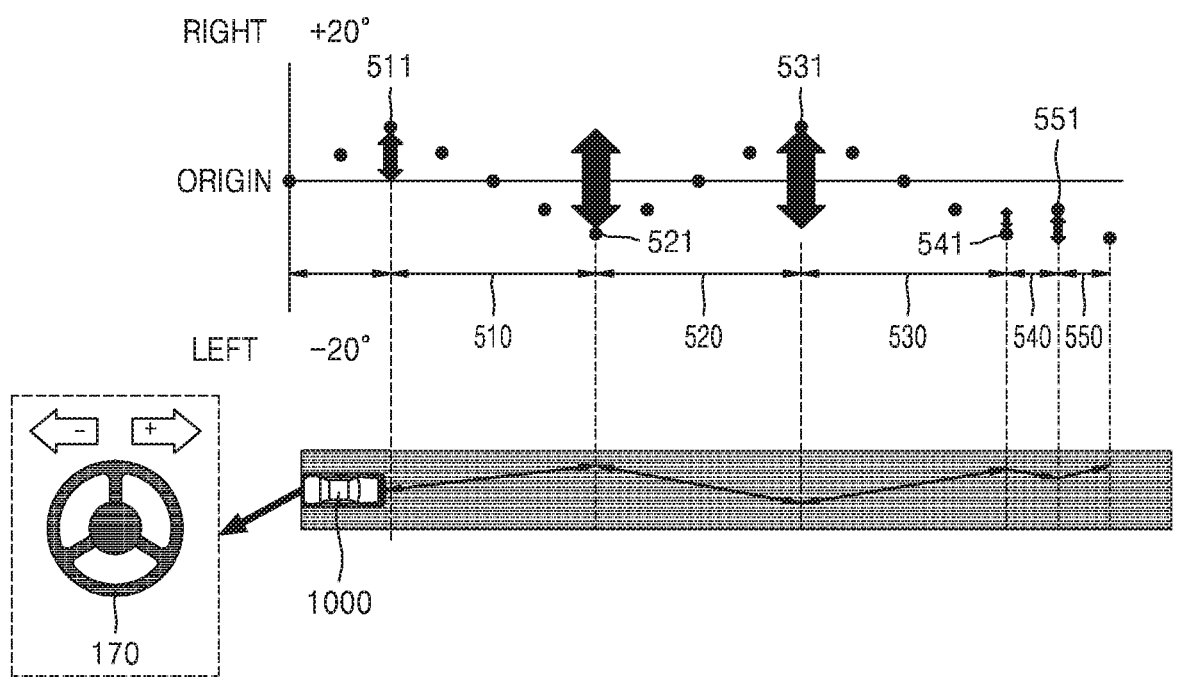
FIG. 5 is a diagram showing an example in which the electronic device senses a steering angle or the number of rotation direction switching events based on motion of the steering wheel, according to an embodiment.

FIG. 5 is a diagram showing an example in which the electronic device 100 senses a steering angle or the number of rotation direction switching events based on motion of the steering wheel 170, according to an embodiment.

The electronic device 100 according to an embodiment may determine a value of a steering angle as a positive value when the steering wheel 170 is rotated in a clockwise direction, and determine the value of the steering angle as a negative value when the steering wheel 170 is rotated in a counterclockwise direction. For example, the steering wheel 170 may be rotated in a clockwise direction at a first point 511 and thus the value of the steering angle may be indicated as a positive value.

The steering wheel 170 may be rotated in a counterclockwise direction in a first section 510. Therefore, the value of the steering angle may be gradually reduced. However, the steering wheel 170 may be rotated in a clockwise direction in a second section 520. Therefore, the rotation direction of the steering wheel 170 is switched from a counterclockwise direction to a clockwise direction at a second point 521. The steering wheel 170 may be rotated in a counterclockwise direction in a third section 530. Therefore, the rotation direction of the steering wheel 170 is switched from a clockwise direction to a counterclockwise direction at a third point 531. In this manner, the steering wheel 170 may be rotated in a clockwise direction in a fourth section 540 and be rotated in a counterclockwise direction in a fifth section 550 and thus the rotation direction of the steering wheel 170 is switched at a fourth point 541 and a fifth point 551. The electronic device 100 may count rotation direction switching events of the steering wheel 170 at the first to fifth points 511 to 551.

The electronic device 100 according to an embodiment may determine a status of a driver by using time intervals between points. For example, the electronic device 100 may determine the status of the driver by using a time interval t1 from the first point 511 to the second point 521, a time interval t2 from the second point 521 to the third point 531, a time interval t3 from the third point 531 to the fourth point 541, and a time interval t4 from the fourth point 541 to the fifth point 551. In this case, considering that a time interval between rotation direction switching events generally increases in proportion to a fatigue level of the driver, the electronic device 100 may determine the fatigue level of the driver by analyzing the time intervals t1 to t4 based on big data.

FIG. 6 is a diagram showing an example in which the electronic device 100 senses a steering angle or a velocity of the vehicle 1000, according to an embodiment.

In a first embodiment 610, the electronic device 100 according to an embodiment may sense a steering angle. For example, the electronic device 100 may sense the steering angle per unit time. Referring to FIG. 6, values of the sensed steering angles may be denoted by a1 to a30. Steering angle variations may be expressed as difference values between the steering angles. Referring to FIG. 6, the steering angle variations may be denoted by a'1 to a'29. The electronic device 100 may obtain a rotation speed by dividing each of the steering angle variations a'1 to a'29 by the unit time.

In a second embodiment 620, the electronic device 100 according to an embodiment may sense a velocity of the vehicle 1000. Referring to FIG. 6, values of the sensed velocities may be denoted by b1 to b30.

FIG. 7 is a diagram showing an example in which the electronic device 100 counts steering direction switching events, according to an embodiment.

A steering direction according to an embodiment may indicate whether a heading direction of the vehicle 1000 is a right direction or a left direction with respect to a forward direction to correspond to a steering angle of the steering wheel 170. The steering direction switching event may indicate a case in which the heading direction of the vehicle 1000 is changed with respect to a forward direction to correspond to the steering angle of the steering wheel 170.

In a first operation 710, the electronic device 100 according to an embodiment may determine an average steering angle during each unit time. For example, Mean1 may be an average value of five steering angles obtained every 0.1 sec. Therefore, Mean1 may indicate an average steering angle during a first 0.5 sec. As another example, Mean2 may indicate an average steering angle during a second 0.5 sec.

In a second operation 720, the electronic device 100 according to an embodiment may count the steering direction switching events by comparing temporally adjacent average steering angles. The electronic device 100 may count the steering direction switching events by determining whether the heading direction of the vehicle 1000 is switched from a right direction to a left direction or from a left direction to a right direction with respect to a forward direction to correspond to the steering angle of the steering wheel 170. For example, when Mean1 has a positive value indicating a right steering direction and Mean2 has a negative value indicating a left steering direction, a product of Mean1 and Mean2 has a negative value and thus a steering direction switching event may be counted (i.e., a count value may be increased by 1). As another example, when Mean2 has a negative value indicating a left steering direction and Mean3 also has a negative value indicating a left steering direction, a product of Mean2 and Mean3 has a positive value and thus a steering direction switching event may not be counted (i.e., the count value may be maintained).

FIG. 8 is a diagram showing an example in which the electronic device 100 counts rotation direction switching events, according to an embodiment.

The electronic device 100 according to an embodiment may monitor rotation direction switching events of the steering wheel 170. The rotation direction switching event according to an embodiment may refer to a case in which a rotation direction of the steering wheel 170 is switched from a clockwise direction to a counterclockwise direction or from a counterclockwise direction to a clockwise direction.

In a first operation 810, the electronic device 100 according to an embodiment may determine a steering angle variation. For example, Gradient Mean1 may indicate a difference between temporally adjacent average steering angles. A value obtained by subtracting Means1 from Mean2 described above in relation to FIG. 7 may be Gradient Mean1. Therefore, in the first operation 810, the electronic device 100 according to an embodiment may determine the steering angle variation per unit time.

In a second operation 820, the electronic device 100 according to an embodiment may count the rotation direction switching events by comparing temporally adjacent average steering angle variations. The electronic device 100 may count the rotation direction switching events by determining whether the rotation direction of the steering wheel 170 is switched from a clockwise direction to a counterclockwise direction or from a counterclockwise direction to a clockwise direction. For example, when Gradient Mean1 has a negative value indicating counterclockwise rotation and Gradient Mean2 has a positive value indicating clockwise rotation, a product of Gradient Mean1 and Gradient Mean2 has a negative value and thus a rotation direction switching event may be counted (i.e., a count value may be increased by 1). As another example, when Gradient Mean2 has a positive value indicating clockwise rotation and Gradient Mean3 also has a positive value indicating clockwise rotation, a product of Gradient Mean2 and Gradient Mean3 has a positive value and thus a rotation direction switching event may not be counted (i.e., the count value may be maintained).

The electronic device 100 according to an embodiment may determine whether to provide an alert to a driver, by counting the rotation direction switching events as described above in relation to FIG. 8.

Figure 9:
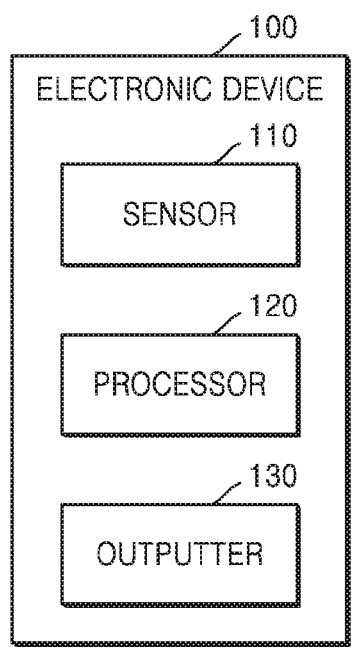
FIG. 9 is a block diagram of the electronic device for assisting a driver of a vehicle, according to an embodiment.

FIG. 9 is a block diagram of the electronic device 100 for assisting a driver of the vehicle 1000, according to an embodiment.

According to an embodiment, the electronic device 100 may include a sensor 110, a processor 120, and an outputter 130. Only elements of the electronic device 100 related to the current embodiment are illustrated in FIG. 9. Therefore, one of ordinary skill in the art would understand that the electronic device 100 may further include general-use elements other than those illustrated in FIG. 9.

The sensor 110 according to an embodiment may sense motion of the steering wheel 170. For example, the sensor 110 may sense a rotation direction of the steering wheel 170, a steering angle of the steering wheel 170, a rotation speed of the steering wheel 170, a steering direction of the steering wheel 170, steering direction switching events of the steering wheel 170, rotation direction switching events of the steering wheel 170, the number of rotation direction switching events of the steering wheel 170 per unit time, the number of steering direction switching events of the steering wheel 170 per unit time, and a rotation angle of the steering wheel 170.

The processor 120 according to an embodiment monitors the rotation direction switching events of the steering wheel 170 based on data obtained from the sensor 110, and obtains a rotation direction switching pattern about the rotation direction switching events of the steering wheel 170.

The electronic device 100 according to an embodiment may monitor the rotation direction switching events of the steering wheel 170 based on the rotation direction sensed by the sensor 110. The rotation direction switching event according to an embodiment may refer to a case in which the rotation direction of the steering wheel 170 is switched from a clockwise direction to a counterclockwise direction or from a counterclockwise direction to a clockwise direction.

The processor 120 according to an embodiment may obtain the rotation direction switching pattern about the rotation direction switching events of the steering wheel 170 by monitoring the rotation direction switching events of the steering wheel 170. The processor 120 according to an embodiment may count and obtain the number of rotation direction switching events of the steering wheel 170 regardless of the steering angle of the steering wheel 170.

The processor 120 according to an embodiment may also obtain patterns other than the rotation direction switching pattern. For example, in addition to the rotation direction switching pattern, the processor 120 may obtain a rotation direction pattern based on time, a steering angle pattern based on time, a rotation speed pattern based on time, a steering direction pattern based on time, a steering direction switching pattern based on time, a pattern of the number of rotation direction switching events based on time, a pattern of the number of steering direction switching events based on time, and a rotation angle pattern based on time. The processor 120 according to an embodiment may determine whether to provide an alert to a driver, by using not only the rotation direction switching pattern but also the above-mentioned other patterns.

The processor 120 according to an embodiment determines whether to provide the alert to the driver of the vehicle 1000, based on the obtained rotation direction switching pattern. The processor 120 according to an embodiment may determine whether to provide the alert to the driver, by using not only the rotation direction switching pattern but also the above-mentioned other patterns, an average velocity of the vehicle 1000, a velocity dispersion of the vehicle 1000, a maximum steering angle of the steering wheel 170, etc.

The processor 120 may determine to provide the alert to the driver, upon determining that a driving status of the vehicle 1000 or a status of the driver is abnormal, based on the obtained rotation direction switching pattern.

The processor 120 according to an embodiment may determine the driving status of the vehicle 1000 or the status of the driver based on the obtained rotation direction switching pattern. The status of the driver may include a fatigue level of the driver.

For example, the processor 120 may determine whether the driver is driving carelessly or while drowsy, by analyzing the rotation direction switching pattern. Upon determining that the driver is driving carelessly or while drowsy, the processor 120 may determine to provide the alert to the driver. As another example, the processor 120 may determine a fatigue level of the driver based on the rotation direction switching pattern, and determine to provide the alert, when the determined fatigue level is equal to or higher than a preset value.

The processor 120 according to an embodiment may use not only the obtained rotation direction switching pattern but also one or more other patterns to determine the status of the driver. For example, the processor 120 may determine the status of the driver by using not only the obtained rotation direction switching pattern but also the steering angle pattern, the rotation speed pattern, the pattern of the number of steering direction switching events, the rotation angle pattern, the average velocity of the vehicle 1000, the velocity dispersion of the vehicle 1000, and the maximum steering angle of the steering wheel 170. The processor 120 according to an embodiment may analyze the above-mentioned one or more patterns including the rotation direction switching pattern, by using a machine learning algorithm, and determine whether to provide the alert to the driver, based on the analysis result. The processor 120 may obtain big data indicating correlations between the motion of the steering wheel 170, the average velocity of the vehicle 1000, the velocity dispersion of the vehicle 1000, or the maximum steering angle of the steering wheel 170, and the status of the driver, and determine whether to provide the alert, by analyzing the big data and the obtained rotation direction switching pattern.

The outputter 130 according to an embodiment may output an audio signal or a video signal. For example, the outputter 130 may include at least one of a display, a head-up display, or a sound output device.

The outputter 130 may output the alert based on a command received from the processor 120. For example, the outputter 130 may display the alert message as an image. As another example, the outputter 130 may output the alert voice message or alert sound through a speaker included in the sound output device. The voice message according to an embodiment may include explanation of solutions to careless driving or drowsy driving.

The electronic device 100 according to an embodiment may prevent careless driving or drowsy driving of the driver by merely monitoring motion of a steering wheel without using, for example, a high-priced sensor for biometrics of the driver.

Figure 10:
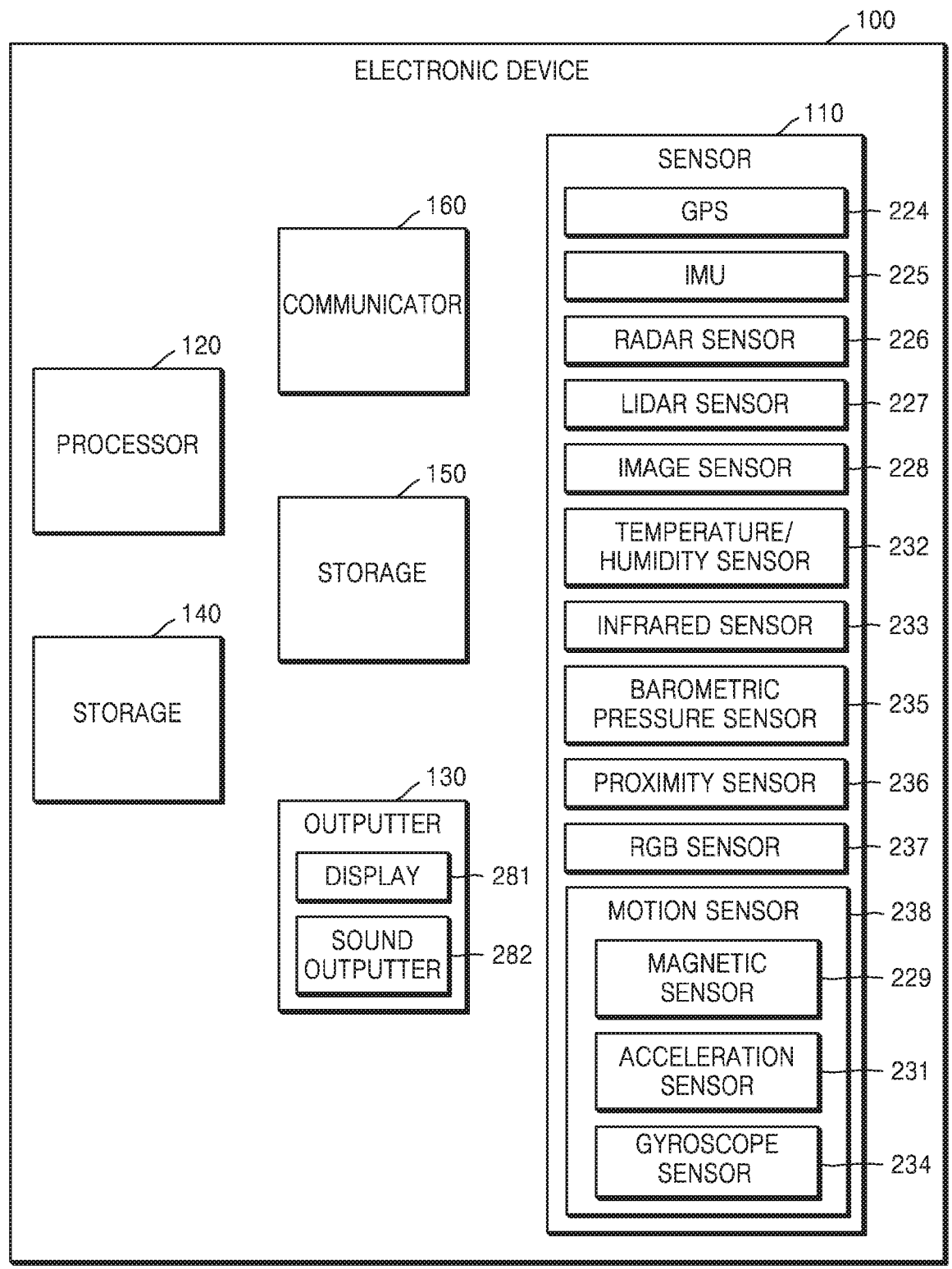
FIG. 10 is a block diagram of the electronic device for assisting a driver of a vehicle, according to another embodiment.

FIG. 10 is a block diagram of the electronic device 100 for assisting a driver of the vehicle 1000, according to another embodiment.

The electronic device 100 according to an embodiment may include the sensor 110, the processor 120, the outputter 130, a storage 140, an inputter 150, and a communicator 160.

The sensor 110 may include a plurality of sensors configured to sense information about an environment where the vehicle 1000 is located, and one or more actuators configured to modify positions and/or orientations of the sensors. For example, the sensor 110 may include a global positioning system (GPS) 224, an inertial measurement unit (IMU) 225, a RADAR sensor 226, a LIDAR sensor 227, and an image sensor 228. The sensor 110 may further include at least one of a temperature/humidity sensor 232, an infrared sensor 233, a barometric pressure sensor 235, a proximity sensor 236, or an RGB sensor (or an illuminance sensor) 237, but is not limited thereto. The sensor 110 may be connected to the steering wheel 170 to sense motion of the steering wheel 170. For example, the sensor 110 according to an embodiment may include only a steering wheel motion sensor (not shown). The sensor 110 may be attached to the vehicle 1000 to sense a velocity of the vehicle 1000. Functions of the sensors may be intuitively inferred from their names by one of ordinary skill in the art, and thus detailed descriptions thereof will not be provided herein.

The sensor 110 may include a motion sensor 238 capable of sensing motion of the vehicle 1000. The motion sensor 238 may include a magnetic sensor 229, an acceleration sensor 231, and a gyroscope sensor 234.

The GPS 224 may be a sensor configured to estimate a geographic location of the vehicle 1000. That is, the GPS 224 may include a transceiver configured to estimate a location of the vehicle 1000 on earth.

The IMU 225 may include a combination of sensors configured to sense location and orientation variations of the vehicle 1000 based on inertial acceleration. For example, the combination of sensors may include accelerometers and gyroscopes.

The RADAR sensor 226 may be a sensor configured to sense objects in an environment where the vehicle 1000 is located, by using radio signals. The RADAR sensor 226 may be configured to sense velocities and/or directions of the objects.

The LIDAR sensor 227 may be a sensor configured to sense objects in an environment where the vehicle 1000 is located, by using laser beams. Specifically, the LIDAR sensor 227 may include a laser light source and/or a laser scanner configured to emit a laser beam, and a detector configured to detect a reflected laser beam. The LIDAR sensor 227 may be configured to operate in a coherent (for example, using heterodyne detection) or incoherent detection mode.

The image sensor 228 may be a still camera or a video camera configured to photograph an external environment of the vehicle 1000. For example, the image sensor 228 may include a plurality of cameras provided at a plurality of positions inside or outside the vehicle 1000.

The storage 140 may include a magnetic disk drive, an optical disk drive, or flash memory. Alternatively, the storage 140 may be a portable universal serial bus (USB) data storage device. The storage 140 may store system software for executing examples related to the present disclosure. The system software for executing examples related to the present disclosure may be stored in a portable storage medium.

The communicator 160 may include at least one antenna for wireless communication with another device. For example, the communicator 160 may be used to communicate with a cellular network or another protocol and system in a wireless manner based on Wi-Fi or Bluetooth. The communicator 160 controlled by the processor 120 may transmit and receive radio signals. For example, the processor 120 may execute a program included in the storage 140, to enable the communicator 160 to transmit and receive radio signals to and from the cellular network.

The inputter 150 refers to a means for inputting data for controlling the vehicle 1000. For example, the inputter 150 may include, for example, a key pad, a dome switch, a touchpad (e.g., a capacitive overlay, resistive overlay, infrared beam, surface acoustic wave, integral strain gauge, or piezoelectric touchpad), a jog wheel, and a jog switch, but is not limited thereto. The inputter 150 may include a microphone configured to receive audio signals (e.g., voice commands) from a user in the vehicle 1000.

The outputter 130 may output audio signals or video signals and include a display 281 and a sound outputter 282.

The display 281 may include at least one of a liquid crystal display (LCD), a thin film transistor-liquid crystal display (TFT-LCD), an organic light-emitting diode (OLED), a flexible display, a three-dimensional (3D) display, or an electrophoretic display. Depending on implementation of the outputter 130, the outputter 130 may include two or more displays 281.

The sound outputter 282 outputs audio data received from the communicator 160 or stored in the storage 140. The sound outputter 282 may include, for example, a speaker or a buzzer.

The inputter 150 and the outputter 130 may include a network interface and may be implemented as a touchscreen.

The processor 120 may comprehensively control the sensor 110, the communicator 160, the inputter 150, the storage 140, and the outputter 130 by executing programs stored in the storage 140.

Figure 11:
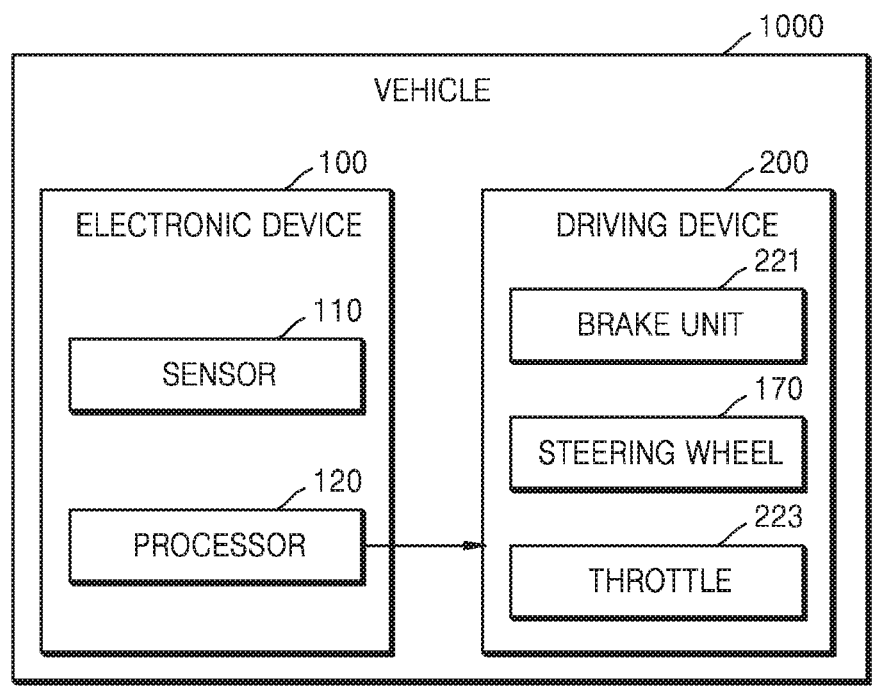
FIG. 11 is a block diagram of a vehicle according to an embodiment.

FIG. 11 is a block diagram of the vehicle 1000 according to an embodiment.

According to an embodiment, the vehicle 1000 may include the electronic device 100 and a driving device 200. Only elements of the vehicle 1000 related to the current embodiment are illustrated in FIG. 11. Therefore, one of ordinary skill in the art would understand that the vehicle 1000 may further include general-use elements other than those illustrated in FIG. 11.

The electronic device 100 may include the sensor 110 and the processor 120.

The driving device 200 may include a brake unit 221, the steering wheel 170, and a throttle 223.

The steering wheel 170 may be a combination of mechanisms configured to control a direction of the vehicle 1000.

The throttle 223 may be a combination of mechanisms configured to control a velocity of the vehicle 1000 by controlling an operation speed of an engine/motor 211. The throttle 223 may control the amount of a mixture gas of a fuel and the air supplied into the engine/motor 211 or control power and thrust by adjusting a throttle opening rate. When the outputter 130 outputs an alert, the throttle 223 according to an embodiment may control the velocity of the vehicle 1000 to be equal to or lower than a preset velocity.

The brake unit 221 may be a combination of mechanisms configured to decelerate the vehicle 1000. For example, the brake unit 221 may use friction to slow down a wheel/tire.

The sensor 110 may sense a velocity of the vehicle 1000 or motion of the steering wheel 170. For example, the sensor 110 may sense a rotation direction of the steering wheel 170 or rotation direction switching events of the steering wheel 170.

The processor 120 may determine whether to provide the alert, based on the motion of the steering wheel 170 sensed by the sensor 110.

Upon determining to provide the alert, the processor 120 may control the electronic device 100 to provide the alert in an audible or visible form.

A device according to the afore-described embodiments may include a processor, a memory configured to store and execute program data, a permanent storage such as a disk drive, a communication port configured to communicate with an external device, and a user interface device such as a touch panel, keys, or buttons. Methods implemented as software modules or algorithms may be recorded on a computer-readable recording medium as computer-readable codes or program commands executable by the processor. Examples of the computer-readable recording medium include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The present disclosure may be described in terms of functional block components and various processing steps. Such functional blocks may be realized by any number of hardware and/or software components configured to perform the specified functions. For example, the present disclosure may employ integrated circuit components, e.g., memory elements, processing elements, logic elements, and look-up tables, which may carry out a variety of functions under the control of one or more microprocessors or other control devices. Similarly, where the elements of the present disclosure are implemented using software programming or software elements, the disclosure may be implemented with any programming or scripting language such as C, C++, Java, or assembler, with the various algorithms being implemented with any combination of data structures, processes, routines or other programming elements. Functional aspects may be implemented in algorithms that execute on one or more processors. Furthermore, the present disclosure could employ any number of conventional techniques for electronic setup, signal processing, and/or data processing. Terms such as "mechanism", "element", "means", and "configuration" may be used broadly and are not limited to mechanical and physical components. These terms may include software routines in association with a processor or the like.

The invention claimed is:

1. An electronic device for assisting driving of a vehicle, the electronic device comprising:
   a sensor configured to sense motion of a steering wheel of the vehicle by a driver;
   an outputter comprising at least one of a display, a head-up display, or a speaker; and
   a processor configured to:
   control the sensor to process data that includes sensor information of a motion of the steering wheel only when a velocity of the vehicle is higher than or equal to a predetermined velocity,
   obtain a motion pattern of the steering wheel by monitoring the motion of the steering wheel using the sensor,
   obtain information regarding a plurality of time points when a rotation direction of the steering wheel is switched from a clockwise direction to a counterclockwise direction or from the counterclockwise direction to the clockwise direction, by analyzing the motion pattern of the steering wheel, determine a fatigue level of the driver, in proportion to length of time intervals between the plurality of time points, and control the outputter to provide an alert to the driver, when the determined fatigue level is equal to or higher than a preset threshold value, wherein the processor is further configured to train with correlations between the motion pattern of the steering wheel and the fatigue level of the driver, by using machine learning, and determine whether to provide the alert to the driver, based on the training using the machine learning, and wherein the data includes information of rotation direction switching events of the steering wheel.

2. The electronic device of claim 1, wherein the processor is further configured to determine the fatigue level of the driver based on a rotation direction switching pattern of the steering wheel sensed by the sensor, and wherein the rotation direction switching pattern of the steering wheel indicates a number of rotation direction switching events of the steering wheel per unit time.

3. The electronic device of claim 1, wherein the sensor is connected to the steering wheel to sense at least one of a steering angle, a rotation speed, a rotation angle, a steering direction, steering direction switching events, or rotation direction switching events of the steering wheel by the driver, a number of rotation direction switching events of the steering wheel per unit time, or a number of steering direction switching events of the steering wheel per unit time.

4. The electronic device of claim 3, wherein the processor is further configured to determine the fatigue level of the driver based on at least one of a steering angle pattern, a rotation speed pattern, a pattern of a number of steering direction switching events, or a rotation angle pattern of the steering wheel sensed by the sensor.

5. The electronic device of claim 1, wherein the processor is further configured to obtain, from an external device or a server, big data indicating the correlations between the motion pattern of the steering wheel and the fatigue level of the driver, and determine the fatigue level of the driver based on the obtained big data.

6. The electronic device of claim 1, wherein the processor is further configured to control the display to display an image including an alert message, based on the determination of the processor.

7. The electronic device of claim 1, wherein the processor is further configured to control the speaker to output at least one of a voice alert message or a voice guidance message explaining solutions to careless driving or drowsy driving.

8. The electronic device of claim 1, further comprising a throttle configured to control a velocity of the vehicle by controlling an operation speed of an engine or a motor of the vehicle, wherein the processor is further configured to control operation of the throttle to control the velocity of the vehicle to be equal to or lower than a preset velocity, upon determining to output the alert.

9. A method of assisting driving of a vehicle, the method comprising:

processing data that includes sensor information of a motion pattern of a steering wheel of the vehicle only when a velocity of the vehicle is higher than or equal a predetermined velocity;

obtaining information regarding a plurality of time points when a rotation direction of the steering wheel is switched from a clockwise direction to a counterclockwise direction or from the counterclockwise direction to the clockwise direction, by analyzing the motion pattern of the steering wheel;

determining a fatigue level of a driver of the vehicle, in proportion to length of time intervals between the plurality of time points; and outputting an audible or visible alert to the driver when the determined fatigue level is equal to or higher than a preset threshold value, wherein the determining of whether to provide the alert comprises:

training with correlations between the motion pattern of the steering wheel and the fatigue level of the driver, by using machine learning; and determining whether to provide the alert to the driver, based on the training using the machine learning, and wherein the data includes information of rotation direction switching events of the steering wheel.

10. The method of claim 9, further comprising:

determining a status of the driver based on a sensed rotation direction switching pattern of the steering wheel, and wherein the rotation direction switching pattern of the steering wheel indicates a number of rotation direction switching events of the steering wheel per unit time.

11. The method of claim 9, wherein the sensing of the motion pattern of the steering wheel comprises sensing at least one of a steering angle, a rotation speed, a rotation angle, a steering direction, steering direction switching events, or rotation direction switching events of the steering wheel by the driver, a number of rotation direction switching events of the steering wheel per unit time, or a number of steering direction switching events of the steering wheel per unit time.

12. The method of claim 11, further comprising:

determining a status of the driver based on at least one of a sensed steering angle pattern, a sensed rotation speed pattern, a sensed pattern of a number of steering direction switching events, or a sensed rotation angle pattern of the steering wheel.

13. The method of claim 9, further comprising:

obtaining, from an external device or a server, big data indicating the correlations between the motion pattern of the steering wheel and a status of the driver; and determining the status of the driver based on the obtained big data.

14. The method of claim 9, wherein the outputting of the alert comprises displaying an image including an alert message.

15. The method of claim 9, wherein the outputting of the alert comprises outputting at least one of a voice alert message or a voice guidance message explaining solutions to careless driving or drowsy driving.

16. A non-transitory computer-readable recording medium having recorded thereon a program for executing the method of claim 9 on a computer.

* * * * *